United States Patent
Schultz et al.

(10) Patent No.: US 10,994,738 B2
(45) Date of Patent: May 4, 2021

(54) METHOD AND CONTROL UNIT FOR OPERATING AN ENGINE OF A VEHICLE

(71) Applicant: Robert Bosch GmbH, Stuttgart (DE)

(72) Inventors: Andreas Schultz, Freiberg am Neckar (DE); Benjamin Pfeil, Freiberg am Neckar (DE); Leo Michels, Oppenweiler (DE); Thomas Brettschneider, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/735,821

(22) Filed: Jan. 7, 2020

(65) Prior Publication Data

US 2020/0223442 A1 Jul. 16, 2020

(30) Foreign Application Priority Data

Jan. 10, 2019 (DE) .......................... 102019200243.9

(51) Int. Cl.
| | |
|---|---|
| *B60W 10/06* | (2006.01) |
| *B60W 10/11* | (2012.01) |
| *B60W 30/19* | (2012.01) |
| *B60W 10/10* | (2012.01) |
| *F02D 41/02* | (2006.01) |

(52) U.S. Cl.
CPC ............ *B60W 30/19* (2013.01); *B60W 10/06* (2013.01); *B60W 10/10* (2013.01); *F02D 41/0215* (2013.01)

(58) Field of Classification Search
CPC ...... B60W 10/06; B60W 10/10; B60W 10/11; B60W 30/18; B60W 30/19; B60W 2030/206; B60W 2520/105; B60W 2530/10; B60W 2540/10; B60W 2710/0644; B60W 2710/0666; B60W 2710/0677; F02D 41/0215
See application file for complete search history.

(56) References Cited

U.S. PATENT DOCUMENTS

| | | | |
|---|---|---|---|
| 2010/0036570 A1* | 2/2010 | Templin ............ | B60W 30/1846 701/54 |
| 2012/0083980 A1* | 4/2012 | Kresse ................ | F16H 61/0213 701/56 |
| 2016/0318517 A1* | 11/2016 | Kuhn .................... | B60W 10/06 |
| 2019/0193736 A1* | 6/2019 | Yamada .............. | B60W 10/196 |

* cited by examiner

*Primary Examiner* — Edwin A Young
(74) *Attorney, Agent, or Firm* — Norton Rose Fulbright US LLP; Gerard Messina

(57) ABSTRACT

A method for operating an engine of a vehicle, in which after an execution of an automated gear change of a transmission of the vehicle, an acceleration force for accelerating the vehicle is requested when a force value representing a present drive force of the engine is in a tolerance band around a reference value determined before the gear change and a request signal for the acceleration force exists.

10 Claims, 1 Drawing Sheet

METHOD AND CONTROL UNIT FOR OPERATING AN ENGINE OF A VEHICLE

CROSS REFERENCE

The present application claims the benefit under 35 U.S.C. § 119 of German Patent No. DE 102019200243.9 filed on Jan. 10, 2019, which is expressly incorporated herein by reference in its entirety.

FIELD

The present invention relates to a method and a control unit for operating an engine of a vehicle.

BACKGROUND INFORMATION

During a gear change, a transmission having transmission steps may not transmit torque. In particular in the case of a change between a forward gear and a reverse gear, a noticeable pause may result, in which the vehicle may not start moving.

If a force or a torque, respectively, is requested during this pause, a jerky acceleration may result after the gear change, since a decoupled engine without load may rev up and abruptly decelerated as soon as the gear change is completed and the engine is engaged again. In the reverse case, the engine may not provide the requested torque during the gear change and stalls as soon as the gear change is completed. To prevent both scenarios in particular in the case of automated driving, a force or torque, respectively, may not be requested for a waiting time, that is longer than the gear change, to load the engine out of a secure stable situation.

SUMMARY

In accordance with the present invention, an example method and an example control unit for operating an engine of a motor vehicle are provided by the approach provided here, and finally a corresponding computer program product and a machine-readable storage medium are provided. Advantageous refinements and improvements of embodiments of the present invention provided here result from the description herein.

Specific embodiments of the present invention may advantageously allow a preferable short waiting time to be waited out in the event of a gear change before the vehicle may be accelerated.

An example method for operating an engine of a vehicle is provided, after an automated execution of a gear change of a transmission of the vehicle with existing request signal to request an acceleration force to accelerate the vehicle, the request is released when a force value representing a present output force of the engine is in a tolerance band around a reference force value determined before the gear change.

Specific embodiments of the present invention may be considered to be based, inter alia, on the description hereafter.

An engine may be understood in particular as an internal combustion engine. A transmission may be in particular an automatic transmission. The transmission may include fixed transmission steps. The transmission steps may be referred to as gears of the transmission. A change of the transmission step used may be referred to as a gear change. The gear change may be in particular a change between a forward gear and a reverse gear of the transmission. During the gear change, a force flow from the engine through the transmission to driven wheels of the vehicle, for example, may be interrupted by a shift clutch. The engine may be separated from the transmission and may rotate freely without load. To prevent a speed increase of the engine separated from the transmission beyond an idle speed, a fuel supply to the engine may be reduced to a minimum during the gear change or temporarily interrupted entirely, respectively. An output force of the engine may thus drop strongly during the gear change. When the force flow is reestablished after the gear change, the fuel supply may again be increased enough that the output force rises again and the engine is regulated to the idle speed. The output force may be proportional to a present torque of the engine, however, it may also represent a force applied to the driven wheels of the vehicle. A force value depicts the drive force and may be provided by an engine controller of the engine as a signal. The signal may be available on a data bus of the vehicle.

A request signal may be provided, for example, by a driver of the vehicle and/or an automated or autonomous, respectively, driving function of the vehicle. The reference value may represent the force value of the output force before the gear change in the idle of the engine. The acceleration force may be greater than the output force in the idle state.

The request for the acceleration force may be released if furthermore a curve of the force value includes a positive gradient. In the case of a positive gradient, the force value increases, and thus becomes greater. It is possible to prevent the engine from stalling in the case of falling force value by a restriction to the positive gradient.

The request for the acceleration force may be released if the force value is within the tolerance band longer than a debouncing period of time. A noisy force value may be compensated for by a debouncing period of time. In the event of an outlier in the curve of the force value which is within the tolerance band for a shorter time than the debouncing period of time, the acceleration force is not requested. Alternatively to the debouncing period of time, a sliding mean value of the force value averaged over a time window may also be considered.

The reference force value may be determined when the gear change is requested. In response to a gear change signal, the force value may be read in and stored as a reference force value. The gear change signal may also be available on the data bus of the vehicle. A more reliable point in time for determining the reference force value is available by way of the use of the gear change signal.

Alternatively, the reference force value may be determined when the gear change is executed. The execution or a beginning, respectively, of the gear change may be identified by an execution signal. The execution of the gear change takes place a short time after the request for the gear change. The output force may be lower at the point in time of the execution than at the point in time of the request. The acceleration force may thus be requested more quickly after the gear change than in the case of a slightly higher reference force value, which is acquired at the point in time of the request of the gear change.

To increase the operational reliability, a reference force value may be detected at each of two points in time, where the lower value may then be used. Since due to a problem, it should become impossible to detect a reference force value at one of the points of time, the other reference force value may be used.

The reference force value may be determined as delayed by an overshoot period of time. Whether at the point in time of the request or at the point in time of the execution, the acquisition may be briefly delayed, since the force value may be noisy at the particular point in time, for example, due to coupled-in interference, and may display unrealistic values. After the overshoot period of time, the force value may have calmed down again. A more realistic force value as a reference force value may be used by way of the overshoot period of time. The acceleration force is thus not requested excessively early or late.

The reference force value may be corrected using a correction factor. The correction factor may represent a transmission difference between transmission ratios of the transmission before and after the gear change. Due to the use of a gear-independent correction factor, the reference force value may represent the drive force actually to be achieved at the driven wheels. The actual drive force is decisive for the driving behavior of the vehicle and is therefore a reasonable reference variable.

A breadth of the tolerance band may be set as a function of a weight of the vehicle. In the case of a light vehicle, a broad tolerance band may be used. In the case of a heavy vehicle, a narrow tolerance band may be used. The weight of the vehicle may be predefined depending on the type. A load sensor in the chassis of the vehicle may also provide a weight value of the vehicle.

The method may be implemented, for example, in software or hardware or in a mixed form of software and hardware, for example, in a device.

The approach presented here furthermore provides a control unit which is designed to carry out, activate, and/or implement the steps of a variant of the method provided here in corresponding devices.

The control unit may be an electrical device including at least one processing unit for processing signals or data, at least one storage unit for storing signals or data, and at least one interface and/or one communication interface for reading in or outputting data which are embedded in a communication protocol. The processing unit may be, for example, a signal processor, a so-called system ASIC, or a microcontroller for processing sensor signals and outputting data signals as a function of the sensor signals. The storage unit may be, for example, a flash memory, an EPROM, or a magnetic storage unit. The interface may be designed as a sensor interface for reading in the sensor signals from a sensor and/or as an actuator interface for outputting the data signals and/or control signals to an actuator. The communication interface may be designed to read in or output the data in a wireless and/or wired manner. The interfaces may also be software modules, which are provided in addition to other software modules on a microcontroller, for example.

A computer program product or computer program is also advantageous, having program code which may be stored on a machine-readable carrier or storage medium such as a semiconductor memory, a hard drive memory, or an optical memory and is used to carry out, implement, and/or activate the steps of the method according to any one of the above-described specific embodiments, in particular when the program product or program is executed on a computer or a device.

It is to be noted that some of the possible features and advantages of the present invention are described herein with reference to different specific embodiments. Those skilled in the art recognize that the features of the control unit and the method may be combined, adapted, or exchanged in a suitable manner to arrive at further specific embodiments of the present invention.

BRIEF DESCRIPTION OF THE DRAWINGS

Specific embodiments of the present invention are described hereafter with reference to the figures, neither the figures nor the description being interpreted as restricting the present invention.

DETAILED DESCRIPTION OF EXAMPLE EMBODIMENTS

Figure 1:
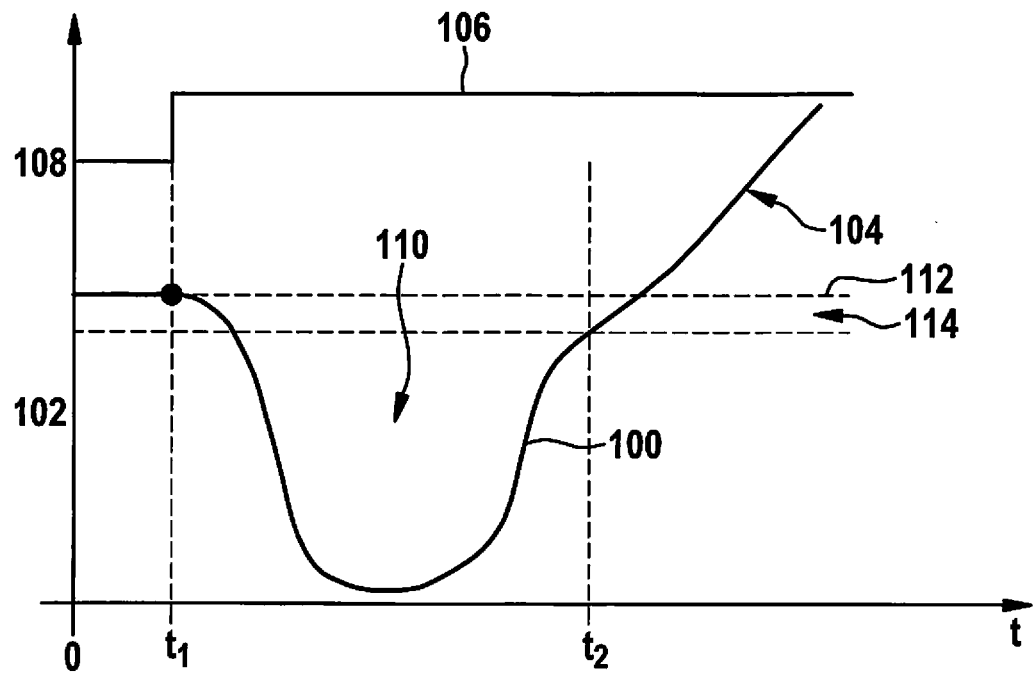
FIG. 1 shows a view of a curve of a force value and a point in time for the request of an acceleration force according to one exemplary embodiment.

The figures are solely schematic and is not to scale. Identical reference numerals identify identical or identically-acting features in the figures.

FIG. 1 shows a view of a curve 100 of a force value 102 and a point in time $t_2$ for releasing a request for an acceleration force 104 according to one exemplary embodiment. Curve 100 is shown in a diagram which has time t plotted on its abscissa and force value 102 plotted on its ordinate. In addition, a curve 106 of a binary gear change request signal 108 is shown. Force value 102 represents an instantaneous output force provided by an engine of a vehicle. Force value 102 is provided by an engine controller of the vehicle. Gear change request signal 108 represents a request for a gear change 110 of a transmission of the vehicle. Gear change request signal 108 is provided, for example, by the engine controller or an automatic driving function of the vehicle.

At a point in time $t_1$, gear change request signal 108 changes its state. The state change represents the request. In response to the state change, a force flow from the engine to the transmission is separated or interrupted. In order that the engine does not speed up out of control in the now unloaded state, its output force is reduced from point in time $t_1$, for example, by reducing a fuel supply and/or an ignition interruption. Curve 100 of force value 102 thus has a dip after point in time $t_1$ during gear change 110. After gear change 110, the drive force is increased again and force value 102 rises again.

In the exemplary embodiment shown here, at point in time $t_1$, presently applied force value 102 is stored as a reference force value 112. As long as force value 102 is below a tolerance band 114 around reference force value 112, an existing request for an acceleration force 104 is held back and/or not released. If force value 102 has risen enough again after gear change 110 such that it is within tolerance band 114 around reference force value 112, point in time $t_2$ is determined and the request for acceleration force 104 is released. Force value 102 rises strongly due to requested acceleration force 104.

Figure 2:
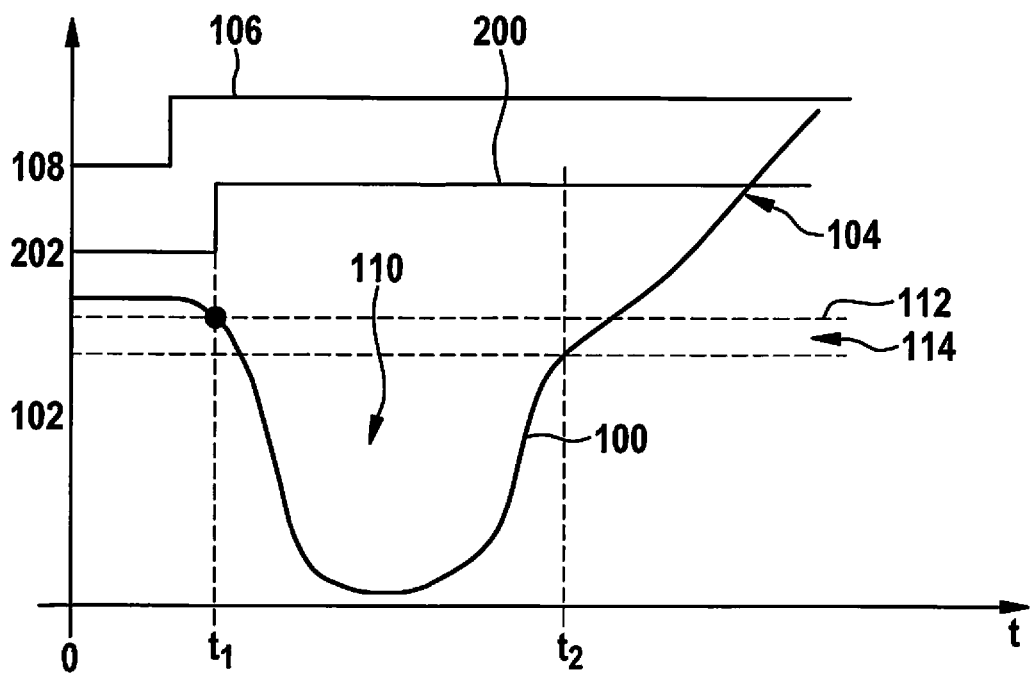
FIG. 2 shows a view of a curve of a force value and a point in time for the request of an acceleration force according to one exemplary embodiment.

FIG. 2 shows a view of a curve 100 of a force value 102 and a point in time $t_2$ for releasing a request for an acceleration force 104 according to one exemplary embodiment. The view in FIG. 2 essentially corresponds to the view in FIG. 1. Additionally thereto, a curve 200 of a binary gear change execution signal 202 is shown. Gear change execution signal 202 is provided by the transmission. A state change of gear change execution signal 202 signals that gear change 110 begins in response to gear change request signal 108.

In the exemplary embodiment shown here, point in time $t_1$ corresponds to the state change of gear change execution signal 202. Therefore, force value 102 already drops in response to the state change of gear change request signal 108 and a lower force value 102 is stored as reference value 112 at point in time $t_1$ than in FIG. 1.

After gear change 110, force value 102 reaches tolerance band 114 around reference force value 112 faster than in FIG. 1. Point in time $t_2$ is thus also determined earlier and the request is released earlier or acceleration force 104 is requested earlier.

In other words, a method for requesting an engine force in conjunction with a gear change for automated driving functions is provided.

Automated driving functions are being integrated more and more frequently into motor vehicles. An automated longitudinal control is used, for example, for functions such as ACC and parking and maneuvering functions.

For this purpose, a setpoint variable is typically determined over multiple steps (for example, evaluation of the raw data, production of a surroundings model, analysis of the overall situation, definition of a driving task) and provided for an actuator control. For example, a setpoint force for the drivetrain may be provided together with a setpoint gear, and also a setpoint force for braking system. During starting, an engine force may be requested and the braking force may be reduced at the same time to enable starting. Uphill on a slope, in contrast, starting may be carried out "against the brake," based on the starting using the handbrake in the case of a human driver. One condition for this is that the actual drive force corresponds to the setpoint force within narrow tolerances. If this is not the case during starting, rolling backward or an uncomfortable vehicle movement may occur.

A situation in which the setpoint drive force frequently does not correspond to the actual force is a gear change taking place in parallel thereto. In this case, the drivetrain is open for a short time and there is no complete traction between engine and wheels, so that the actual force drops strongly. Such a situation may occur in particular in the case of an automated parking function, since there are frequent changes between forward and reverse gears for this purpose.

This situation has heretofore typically not been taken into consideration or a fixed minimum time is waited out after a gear change before the drive force is requested. The comfort losses associated therewith, for example, have been accepted.

In the approach provided here, in contrast thereto, in the case of a gear change, a suitable point in time for requesting the drive force is determined based on the present actual drive force.

As shortly as possible before the gear change, a reference value of the drive force is determined on the basis of the present actual force without force request ("idle" force) and the collapse of the actual drive force subsequently caused by the gear change is monitored in such a way that the request for a setpoint force only takes place when the actual force drops into a tolerance range around the reference value of the drive force. Furthermore, the request may take place when the time gradient of the actual force is positive. In addition, the mass and the transmission ratio may be taken into consideration.

Using the approach provided here, there is no reduction of the drive force required for safe starting during a gear change. A setpoint specification may thus be set more accurately and in particular the comfort and thus the acceptance of an automated driving function are increased.

Overcompensation of the controller during the drop of the actual force may be prevented by the monitoring of the gear change, so that a very large setpoint force is not requested. A subsequent overshoot of the vehicle and/or a strong load of the actuators may be prevented in this way. It is ensured by the method provided here that an increased setpoint force is only requested if the drivetrain may also transmit the corresponding force.

In the case of a gear change without monitoring, a fixed waiting time before the request for a force may be maintained. However, a relatively long time passes until starting of the vehicle occurs after a gear change. In contrast thereto, in the provided method, an earlier point in time for requesting a force is ascertained. In this way, the vehicle starts more rapidly between gear changes and the acceptance of the function is increased.

The items of information used are generally signals provided by the drivetrain. Additional signals are thus not necessary. The complexity of the overall system is reduced in this way and costs are saved during the development. The communication provided here between control units takes place in particular in the case of gear changes at a standstill.

A curve of the actual force applied by the drivetrain to the wheels, for example, over the time during a gear change is shown by way of example in FIG. 1. Force value 102 is identified here as actual force PtFAct. The vehicle is at a standstill at point in time t=0. In this case, force PtFAct applied by the drivetrain is compensated for by a corresponding braking force. In this state, a gear change and a subsequent start of the vehicle are carried out.

At the moment of the request for a gear change (GearRq, $t=t_1$), presently applied drive force PtFAct is accepted as reference force value 112 here. Reference force value 112 may be identified as reference value IdleFRef.

A collapse of present drive force PtFAct subsequently occurs because of carrying out the gear change.

A setpoint force for starting is requested or a request is released when applied drive force PtFAct exceeds a tolerance value IdleFTol below IdleFref and the time gradient of PtFAct is positive ($t=t_2$). Tolerance value IdleFTol identifies a lower limit of tolerance band 114 here.

The difference between IdleFTol and IdleFRef in relation to IdleFRef may be, for example, 3% to 70%, in particular 5% to 20%.

In FIG. 2, the point in time of the gear request (GearRq) is not used to determine reference value IdleFRef, but rather the point in time at which the transmission actually initiates the gear change (GearStat). This has the advantage in particular that reference value IdleFRef may be determined even more accurately and thus generally point in time $t_2$ occurs earlier. The time delay between a gear change and the starting of the vehicle may thus be reduced.

In one exemplary embodiment, in addition a time $\Delta t_c$ is waited out before the determination of reference value IdleFRef. This is advantageous because upon opening of the drivetrain, a brief incorrect raising of the value of PtFAct sometimes occurs. This phase is ignored due to time $\Delta t_c$ and an incorrect value IdleFRef is not determined. Time $\Delta t_c$ may be, for example, 10 ms to 1000 ms, in particular 50 ms to 300 ms.

In one exemplary embodiment, the tolerance band around IdleFRef is selected as a function of mass. A larger tolerance band may advantageously be selected for a light vehicle, since in this case a lesser instantaneously applied force PtFAct may already be sufficient for starting and/or a somewhat too low instantaneously applied force PtFAct does not have noticeable consequences, which are visible or perceptible in the vehicle movement. On the contrary, the vehicle starts faster and the acceptance of the automated function is increased.

In one exemplary embodiment, point in time $t_2$ is first determined when applied force PtFAct of at least a time $\Delta t_A$ was within the tolerance band and the time gradient of PtFAct at the point in time of the entry into the tolerance band was positive. This has the advantage in particular that the detection of the optimum point in time functions more robustly. Point in time $t_2$ may thus be detected correctly even if value PtFAct is, for example, very noisy. Point in time $t_2$ is thus not triggered, for example, by an outlier, after which value PtFAct drops below the limit of the tolerance band again. The starting of the vehicle may thus be prevented until the gear change has progressed sufficiently far.

Time $\Delta t_A$ may be, for example, 10 ms to 3000 ms, in particular 100 ms to 600 ms.

In one exemplary embodiment, reference value IdleFRef is not identical to force PtFAct applied at point in time $t_1$, but rather the transmission ratio selected after the gear change is taken into consideration. A possibly existing difference between the stationary values of PtFAct for $t \ll t_1$ and $t \gg t_2$ is thus taken into consideration and the detection becomes even more robust.

In another exemplary embodiment, starting is additionally always carried out after a fixed time $\Delta t_B$ since beginning the gear change, independently of whether PtFAct meets the conditions or not. This has the advantage in particular that starting of the vehicle also takes place for the case that point in time $t_2$ may not be ascertained using the above-described method. In this case, it is advantageous to accept uncomfortable starting or slight rolling back of the vehicle, since otherwise the automated function would have to be terminated. Time $\Delta t_B$ may be, for example, 500 ms to 20 seconds, in particular 2 seconds to 8 seconds.

Finally, it is to be noted that terms such as "having," "including," etc. do not exclude other elements or steps and terms such as "a" or "one" do not exclude a plurality.

What is claimed is:

1. A method for operating an engine of a vehicle, comprising the following steps:
   executing an automated gear change of a transmission of the vehicle; and
   after the execution of the automated gear change, in the case of an existing request signal for requesting an acceleration force for accelerating the vehicle, releasing the request when a force value representing a present drive force of the engine is within a tolerance band around a reference force value determined before the gear change.

2. The method as recited in claim 1, wherein the request is released when a curve of the force value includes a positive gradient.

3. The method as recited in claim 1, wherein the request is released when the force value is within the tolerance band longer than a debouncing period of time.

4. The method as recited in claim 1, wherein the reference force value is determined when the gear change is requested.

5. The method as recited in claim 4, wherein the reference force value is determined delayed by an overshoot period of time.

6. The method as recited in claim 1, wherein the reference force value is determined when the gear change is executed.

7. The method as recited in claim 1, wherein the reference force value is corrected using a correction factor, the correction factor representing a transmission difference between transmission ratios of the transmission before and after the gear change.

8. The method as recited in claim 1, wherein a breadth of the tolerance band is set as a function of a weight of the vehicle.

9. A control unit configured to operate an engine of a vehicle, the control unit configured to:
   execute an automated gear change of a transmission of the vehicle; and
   after the execution of the automated gear change, in the case of an existing request signal for requesting an acceleration force for accelerating the vehicle, release the request when a force value representing a present drive force of the engine is within a tolerance band around a reference force value determined before the gear change.

10. A non-transitory machine-readable storage medium on which is stored a computer program product including a computer program for operating an engine of a vehicle, the computer program, when executed by a computer, causing the computer to perform the following steps:
   executing an automated gear change of a transmission of the vehicle; and
   after the execution of the automated gear change, in the case of an existing request signal for requesting an acceleration force for accelerating the vehicle, releasing the request when a force value representing a present drive force of the engine is within a tolerance band around a reference force value determined before the gear change.

\* \* \* \* \*